Jan. 8, 1935.    D. P. MAHONEY    1,987,263
HORSESHOE
Filed Sept. 1, 1932
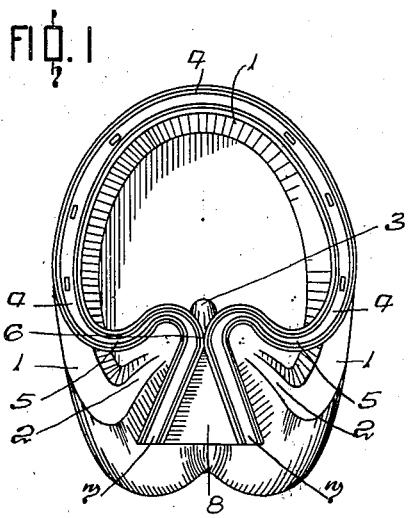
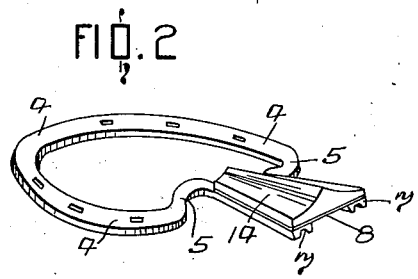
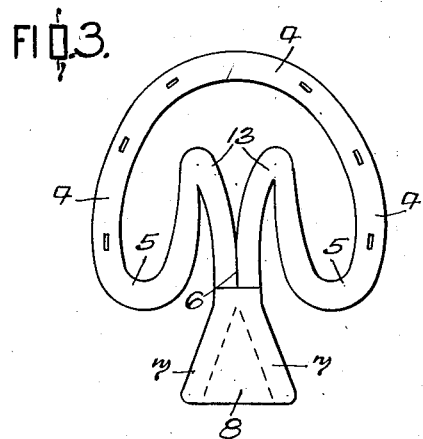
D. P. Mahoney
INVENTOR
By: Marks & Clerk
ATTYS.

Patented Jan. 8, 1935

1,987,263

UNITED STATES PATENT OFFICE 1,987,263

HORSESHOE

Daniel Patrick Mahoney, New Brighton, near Christchurch, New Zealand

Application September 1, 1932, Serial No. 631,421
In New Zealand September 25, 1931

1 Claim. (Cl. 168—4)

This invention relates to horse-shoes.

As hitherto made such shoes have been arranged to provide a tread or ground-contacting surface, which simply follows the rim of the hoof. By the use of a shoe of this kind the whole of the weight and impact when striking the ground is thrown upon the walls of the hoof, with the result that when travelling on hard ground the animal is apt to develop corns and other troubles tending to give rise to lameness.

In the case of a horse in the natural, or unshod, condition however it is found that the foot meets the ground first at the rear or heel portion where is situated the frog, which latter being of a resilient nature provides a cushioning effect thus minimizing the shock.

It is the object of the present invention therefore to provide an improvement in horse-shoes whereby the animal will be enabled to utilize the frog, thus avoiding the undesirable effect resulting from the use of shoes of the ordinary type as above explained.

A further object of the invention also is to provide a shoe of novel and special form whereby the rear terminals of the shoe will lie at such a position as to preclude the possibility of such portions of the shoe being trodden upon by the other feet of the animal or causing injury to the legs in cases where the animal has a high action of the feet. A shoe constructed in accordance with the present invention tends also to prevent a screwing or twisting of the feet upon the ground which is apt to lead to a bad leg action.

In carrying this object into effect according to the present invention, there is provided upon the shoe a plate arranged to underlie the frog and to afford a bearing for the latter upon the ground.

In order that the nature of the invention and its construction may be clearly understood, it will now be fully described and explained with reference to the accompanying drawing, in which:—

Fig. 1 shows the underside of a hoof with a shoe embodying a preferred form of the present invention attached in place thereon, Fig. 2 shows in perspective a shoe similar in form to that of Fig. 1 as viewed from the upper side, or side next to the hoof and illustrating a construction employed in cases where the frog has become hollow or defective.

Fig. 3 is a plan view illustrating a further modification.

In the representation as shown in Fig. 1, 1 is the hoof, 2 are the bars and 3 is the frog.

In a preferred form of the invention, as shown in this figure the shoe 4 is curved to follow the rim of the hoof in the usual manner around the toe and side portions to points approximately opposite the forward end of the frog 3. At such points the two sides of the shoe are curved inward, as at 5, to converge or approach one another at a point as 6 approximately at the forward end of the frog and at which point commences a plate which is preferably triangular in plan to follow the lateral sides of the frog 3 to the rear termination of the latter.

In the preferred form of the construction as here shown also the two sides of the shoe are continued from their said point of convergence 6 at the forward end of the frog to extend rearwardly diverging gradually as at 7 to follow generally the sides of the frog to the rear end of the latter and to which diverging portions 7 a plate 8 or metal surface is attached to extend therebetween, as by riveting or welding it to such portions 7.

The arrangement is such that the said portions 7 of the shoe at which the plate 8 occurs, extend flush with the other portions of such shoe and thus provide the tread or surface by means of which such plate bears upon the ground.

If desired also as shown in Fig. 3, the sides of the shoe, commencing from the points at which they curve inward, may be curved forward for a suitable distance towards the toe, as for example to points as 13, and then rearward again to the point 6 at which they converge upon the frog-plate, by which construction the shoe is given a certain amount of toe-loading which is desirable in some cases in order to compensate for the weight of the frog-plate.

In all cases however, if so desired, the sides of the shoe may be curved inward at points nearer the toe than those shown in the drawing, thus causing the shoe to afford support at the frog and toe portion of the hoof only.

In the case of standard shoes, the shoe and its frog-plate may be formed in one piece, as for instance by stamping or drop-forging.

In all cases however the said plate will be arranged so that its upper side will underlie and bear against the frog while the underside of such plate will be adapted to bear upon the ground.

In cases where the frog has become defective, or hollow, the said frog-plate will be provided at its upper side with a pad of rubber 14 (Fig. 2) adapted to fit within the hollow and thus make up the deficiency.

From the foregoing description it will be seen that by the present invention the animal will be enabled by means of the frog-plate to make full use of the frog without injury or wearing of the latter, while by the incurved formation of the sides of the shoe to the part at which the frog-plate is carried, the rear portions of such shoe will be placed at such positions as to preclude the possibility of such portions being trodden upon by the other feet of the animal or causing injury to the legs.

Again the provision of the frog-plate at the rear of the shoe will give the latter additional grip upon the ground thereby tending to prevent screwing or twisting of the feet upon the ground, as hereinbefore mentioned.

I claim:

A horse-shoe composed of a bar formed to extend around the underside of the hoof at the toe and for a desired distance around the sides thereof to points at which the portions of such bar are curved inward to converge at a point approximating to the forward end of the frog and from which such portions diverge to follow approximately the lateral sides of the frog to the rear termination of the latter, and a relatively thinner plate of triangular contour secured upon said rear diverging portions of the bar to provide on the rear upper side of the shoe a flat continuous surface to underlie and receive the pressure of the frog.

DANIEL PATRICK MAHONEY.